United States Patent [19]
Yoshikawa et al.

[11] Patent Number: 5,097,670
[45] Date of Patent: Mar. 24, 1992

[54] WATER CHILLING METHOD AND APPARATUS FOR THE SAME

[75] Inventors: Tomio Yoshikawa, Shimizu; Tetsuji Yamashita, Shizuoka; Kyoshiro Murakami; Takashi Kato, both of Shimizu; Hiromu Yasuda, Shizuoka; Shizuo Zushi, Hadano, all of Japan

[73] Assignee: Hitachi, Ltd, Tokyo, Japan

[21] Appl. No.: 645,392

[22] Filed: Jan. 24, 1991

[30] Foreign Application Priority Data

Jan. 24, 1990 [JP] Japan .................................. 2-13904

[51] Int. Cl.⁵ .............................................. F25B 7/00
[52] U.S. Cl. ........................................ 62/99; 62/175; 62/228.4; 417/5
[58] Field of Search ........................ 62/175, 228.4, 201, 62/99; 417/5; 236/1 EA

[56] References Cited

U.S. PATENT DOCUMENTS 4,480,442 11/1984 Ide et al. ...................... 62/228.4 X
4,483,152 11/1984 Bitondo ............................ 236/1 EA
4,876,859 10/1989 Kitamoto ........................... 62/175 X

*Primary Examiner*—William E. Wayner
*Attorney, Agent, or Firm*—Antonelli, Terry, Stout & Kraus

[57] ABSTRACT

A water chilling apparatus comprising a plurality of chilling modules each having a refrigerating cycle mainly composed of a compressor, a condensor, an evaporator and an expansion mechanism, and a control module having a water pump for feeding, to an object to be chilled, chilling water cooled down by the evaporator of each chilling module, a detector for detecting a temperature of the chilling water and a water temperature controller. A chilling ability of each chilling module in response to a variable frequency is kept at substantially the same level. A capacity of the compressor of each chilling module is variably controlled in a range between an upper limit capacity and a lower limit capacity. The water temperature controller is used to calculate a whole necessary capacity value needed in the compressors of all the chilling modules as a function as a deviation between a set value of the chilling water temperature and a chilling water temperature detected by the detector. The number of the operated chilling modules is controlled in response to the whole necessary capacity value and the upper and lower capacities of each of the chilling modules. The capacity of the compressor of each of the cooling modules is controlled so as to have a capacity value obtained by equally distributing the calculated whole necessary capacity value by the number of the operated chilling modules.

4 Claims, 3 Drawing Sheets

WATER CHILLING METHOD AND APPARATUS FOR THE SAME

BACKGROUND OF THE INVENTION

The present invention relates a water chilling method and an apparatus for the same, and more particularly to a water chilling method and apparatus suitable for cooling a large size computer.

As is well known, a computer includes a number of semiconductors and the semiconductors generate heat. It is thus necessary to cool down the semiconductors. It has been proposed and practiced that the semiconductors are directly cooled down. Such a chilling unit for a computer was disclosed in, for example, Electric Wave Newspaper issued on Apr. 19, 1988. This chilling unit uses independent modules to enhance a backup function. The control circuits therefor are also independent of each other. In this system, since it is possible to operate a spare machine at any desired time by switching backup automatic/manual operations, the system may cope with a temporary increment of load in such a case that the computers are replaced.

However, in that system, a sufficient consideration is not made as to the case where the cooling load becomes extremely small. In this case, the system suffers from difficulties that a temperature of the chilling water is too low or a change in water temperature is remarkable due to the stop of the chilling unit.

SUMMARY OF THE INVENTION

An object of the invention is to provide a water chilling apparatus which is capable of feeding a constant temperature chilling water, i.e., chilling water kept at a set temperature for any type of load in the ability range of water chilling units.

In order to attain this and other objects, according to the invention, there is provided a water chilling apparatus comprising a plurality of chilling modules each having a refrigerating cycle mainly composed of a compressor, a condensor, an evaporator and an expansion mechanism, and a control module having a water pump for feeding, to an object to be chilled, chilling water cooled down by the evaporator of each chilling module, a detector for detecting a temperature of the chilling water and a water temperature controller, wherein a chilling ability of each chilling module in response to a variable frequency is kept at substantially the same level; a capacity of the compressor of each chilling module is variably controlled in a range between an upper limit capacity and a lower limit capacity; the water temperature controller is used to calculate a whole necessary capacity value needed in the compressors of all the chilling modules as a function as a deviation between a set value of the chilling water temperature and a chilling water temperature detected by the detector; the number of the operated chilling modules is controlled in response to the whole necessary capacity value and the upper and lower capacities of each of the chilling modules; and the capacity of the compressor of each of the cooling modules is controlled so as to have a capacity value obtained by equally distributing the calculated whole necessary capacity value by the number of the operated chilling modules.

Also, according to another aspect of the invention, there is provided, in a method for chilling water by using a water chilling apparatus comprising a plurality of chilling modules each having a refrigerating cycle mainly composed of a compressor, a condensor, an evaporator and an expansion mechanism, and a control module having a water pump for feeding, to an object to be chilled, chilling water cooled down by the evaporator of each chilling module, a detector for detecting a temperature of chilling water and a water temperature controller, the method comprising the following steps of; providing the chilling modules which have substantially the same chilling ability relative to a variable frequency and in which the compressors are controlled in capacity in a range from an upper capacity and a lower capacity; calculating a whole necessary capacity value needed in all the chilling modules as a function of a deviation between a set value of the chilling water temperature and a chilling water temperature detected by the detector; determining the number of the operated chilling modules in response to the whole necessary capacity value and the upper and lower limit capacities of the respective chilling modules; and controlling the capacities of the operated chilling modules so as to have a capacity value obtained by equally distributing the calculated whole necessary capacity value by the number of the operated chilling modules.

DESCRIPTION OF THE PREFERRED EMBODIMENTS

Figure 1:
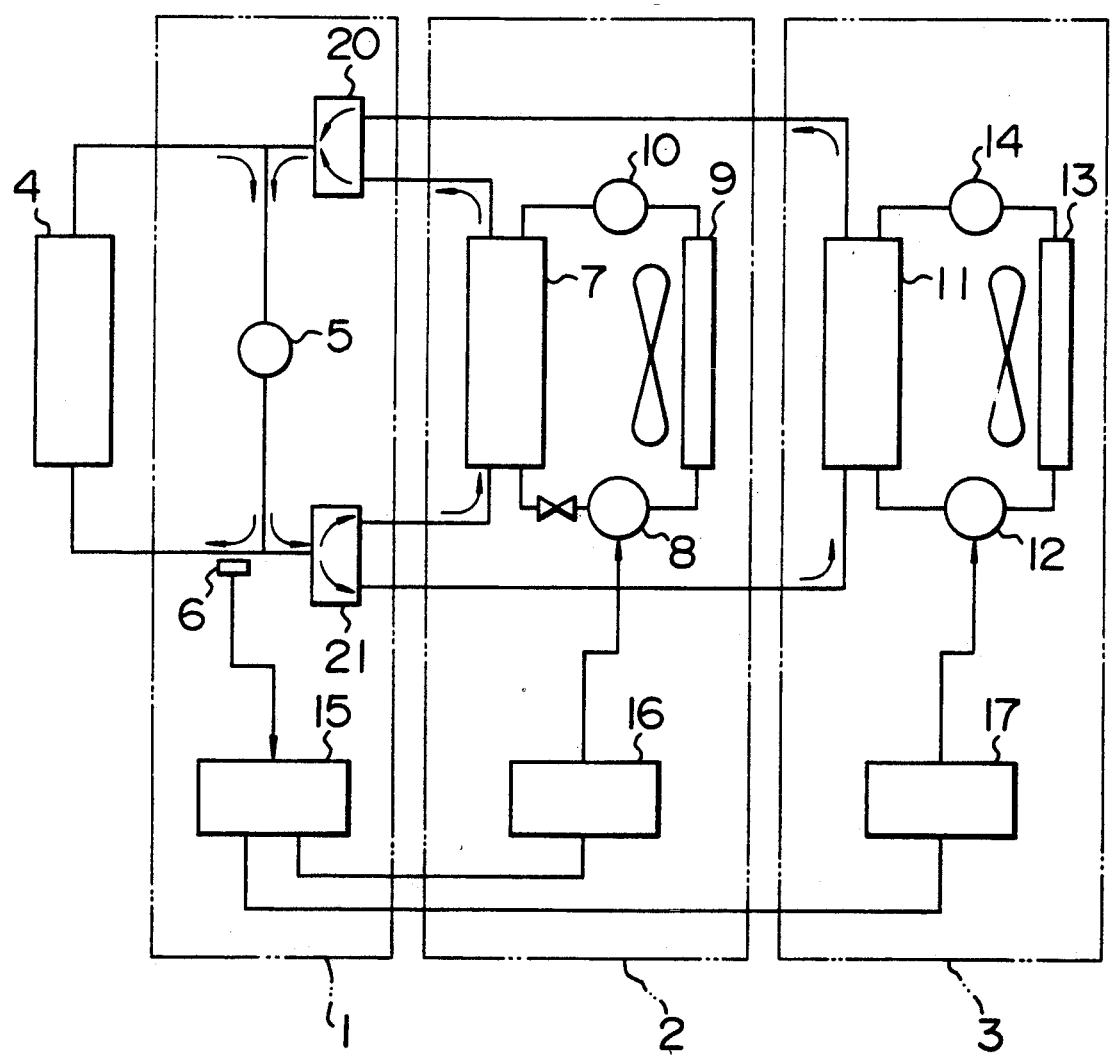
FIG. 1 is a schematic view showing a structure according to one embodiment of the invention.

The present invention will now be described with reference to the accompanying drawings. As shown in FIG. 1, a water chilling apparatus in accordance with one embodiment of the invention is composed of a control module 1 and chilling modules 2 and 3.

The control module 1 includes a pump 5, a water temperature sensor 6 and a control module controller 15. The controller 15 sends/receives signals in a serial transfer manner with chilling module controllers 16 and 17 and calculates the number of the chilling modules being operated, as described later in accordance with a deviation between the chilling water temperature detected by a water temperature sensor 6 and a chilling water temperature set value (set in the controller 15). Furthermore, the controller 15 also calculate a capacity value of the compressor, i.e., a frequency of an inverter for driving the compressor.

Respective component of the chilling modules 2 and 3, i.e., compressors 8 and 12, condensors 9 and 13, expansion mechanisms 10 and 14, and evaporators 7 and 11 have substantially the same specifications. Accordingly, the respective modules 2 and 3 have substantially the same specifications and their chilling or cooling ability rated values are substantially the same. The compressors 8 and 12 are controlled in capacity in accordance with revolution speeds under the inverter frequency control in the chilling module controllers 16 and 17 on the basis of the signals from the control module 1.

In each chilling module 2, 3, and upper limit of the drive frequency of the compressor 8, 12 is a (Hz) and a lower limit thereof is b (Hz). In order to keep the continuity in chilling ability in switching the number of the chilling modules which are operative, the upper and lower limits meets the condition:

$2b \leq a$

Figure 2:
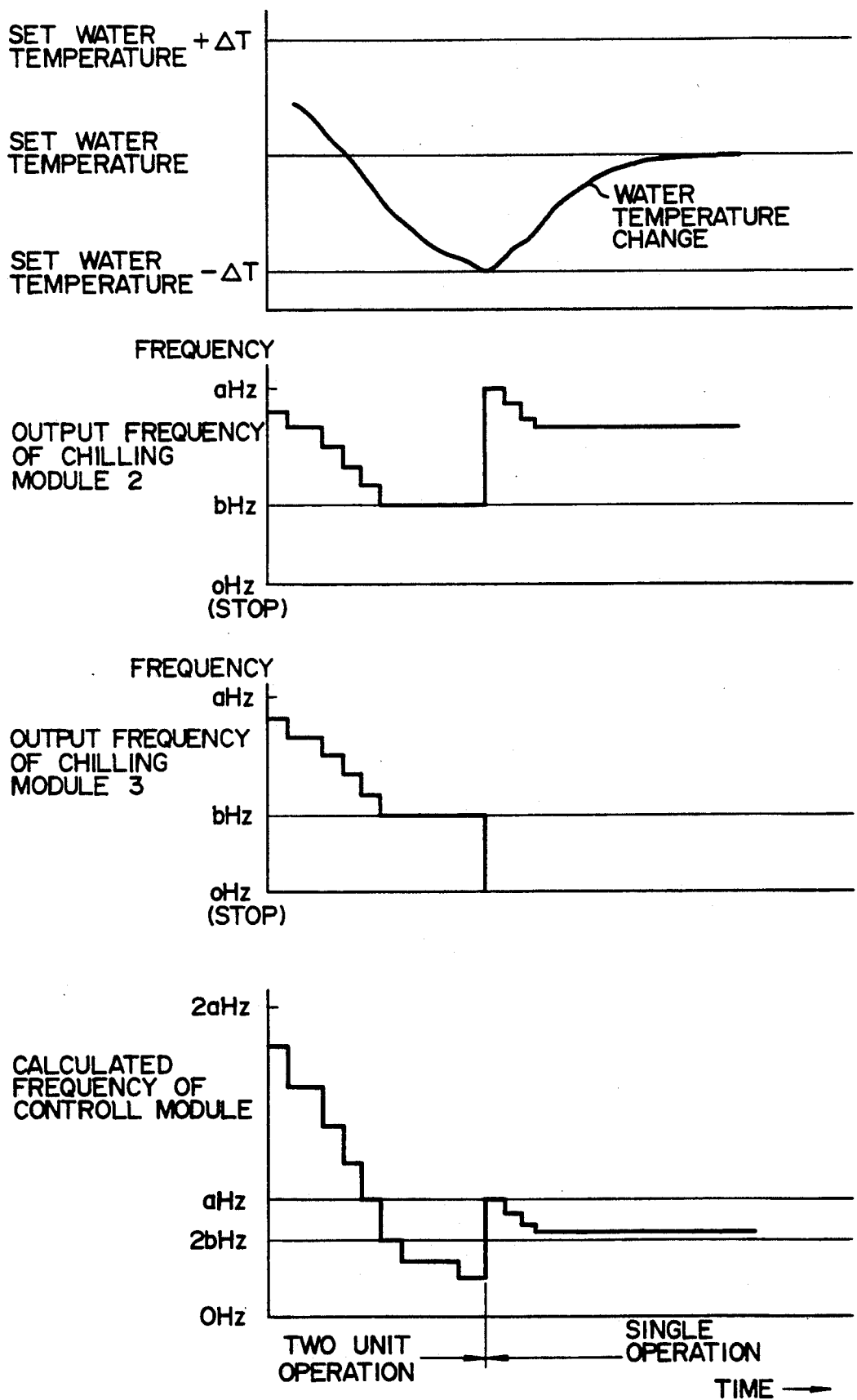
FIG. 2 is a time chart for illustrating the operation of the embodiment.

The operation of the foregoing embodiment will be described with reference to FIGS. 2 and 3.

A chilling water is recirculated between the control module 1 and an object 4 to be cooled, i.e., a large size computer, for example, by the pump 5. The temperature of the chilling water fed to the object 4 to be cooled is detected by the water temperature sensor 6. The control module 1 calculates a frequency to be applied to the controllers 16 and 17 of the compressors within the chilling modules 2 and 3 in accordance with the difference between the detected water temperature and the set value. The water warmed through the object 4 to be cooled and the chilling water cooled through the chilling modules and fed from a mixer 20 are absorbed into and agitated by the pump 5 and are fed into the object 4 to be cooled, to be fed out from the respective chilling modules 2 and 3 through a brancher 21. The chilling water flowing through the object 4 cools the object 4. The water flowing through the chilling modules 2 and 3 is again cooled and absorbed through the mixer 20 into the pump 5. Thus, the water cools the object 4 while being recirculated in the closed path. The compressor 8 of the chilling module 2 is operated in accordance with operational commands (operation/stop commands) and command frequencies from the control module 2. A cooling medium gas compressed through the compressor 8 will flow through a path of the condensor 9, the expansion valve 10 and the evaporator 7 in this order and will repeat change in state to cool the water through the heat exchange with the eater fed out of the pump 5 in the evaporator 7. Also in the cooling module 3, the same operation as that of the chilling module 2 is performed to cool the water.

If the load is less than the maximum cooling ability of the two modules (i.e., within twice a range of the compressor operative maximum frequency a Hz of the two chilling modules), it is possible to impart the cooling effect so that the cooling temperature is at the set water temperature.

Figure 3:
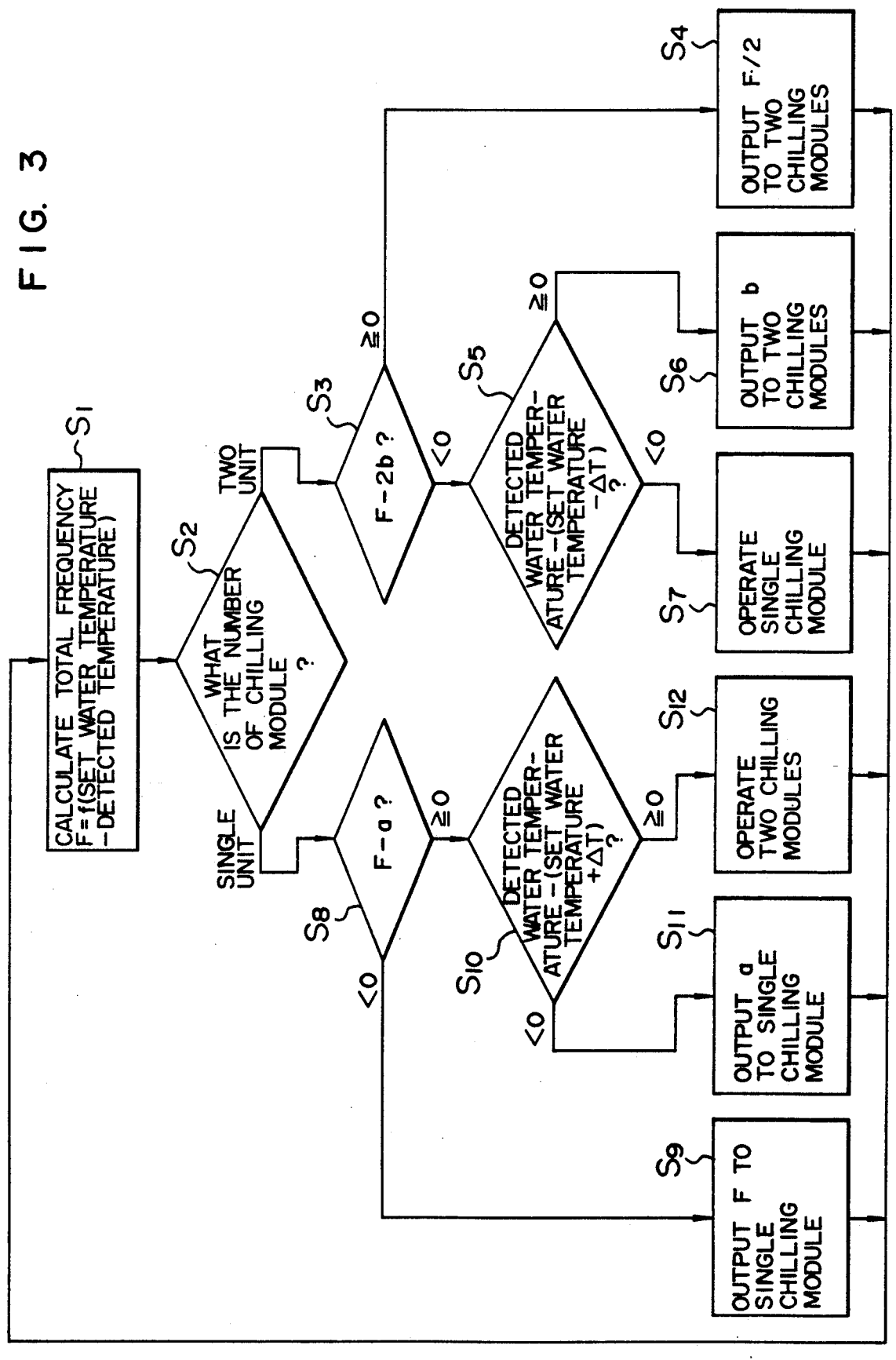
FIG. 3 is a flow chart for the operation shown in FIG. 2.

As shown in FIG. 3, in the normal operation, the controller 15 in the control module 1 calculates and outputs a sum F of the operational frequencies (inverter frequencies) of the compressors of the chilling modules 2 and 3 in response to the difference between the water temperature detected by the water temperature sensor 6 and the set water temperature in every constant sampling time period (Step 1).

Subsequently, the number of the cooling modules which is now being operated is judged (Step 2). If the two modules are operated and it is judged in Step 3 that the relationship, $F \geq 2b$ is established, the calculated frequency F is equally output into the two chilling modules 2 and 3 (Step 4).

On the other hand, if the cooling load is reduced and the frequencies F calculated by the control module 1 is not greater than 2b Hz, the cooling ability is large in comparison with the cooling load in the two-cooling module operation so that it would be impossible to control the chilling water temperature at the set temperature. Accordingly, when the relationship, $F < 2b$ Hz, is established, it is judged whether the detected water temperature is not smaller than or less than (the set temperature $-\Delta T$) where the $\Delta T$ is the allowable temperature difference (Step 5). If the deviation is equal to or exceeded, the two chilling modules 2 and 3 are operated at the minimum frequency b Hz of each possible operation frequency (Step S5). However, if the detected temperature less than the deviation, the single chilling module is stopped and the other single chilling module is only operated (Step 7). Thus, the frequency calculated by the controller 15 of the control module 1 is output only into the single chilling module, and the single chilling module is controlled in the range of b to a Hz, so that the cooling temperature exceeds (set temperature $-\Delta T$) and approaches the set value.

When it is judged in Step S2 that the single chilling module is now operated, if the calculated frequency F is less than the maximum frequency a Hz (Step S8), the calculated frequency F is continuously output to the single chilling module to operate only the single chilling module (Step S9). In the case where the calculated frequency F exceeds the maximum frequency a Hz, it is judged whether the detected water temperature is not smaller than or smaller than (the set water temperature $+\Delta T$) (Step S10). If the detected water temperature is smaller than the value, only the single module is continuously operated at the maximum frequency a Hz (Step S11). Inversely, if the detected water temperature is not smaller than the value, the calculated frequency F is divided and output into the two chilling modules to operate the two modules (Step S12). In this case, the operational frequency is 2a Hz at maximum, so that the chilling ability is greater than the load so as to cause the chilling water temperature to approach the set value. In this case, also in order to impart the continuity to the chilling ability of the single or two module operation, the relationship, $2b < a$, should be met as described before.

In the foregoing embodiment the two chilling modules are used. It is however apparent that, if the three, four and other suitable number of the chilling modules are used in response to the load, it is possible to cope with the broader load.

As described above, according to the embodiment, it is possible to advantageously control the water temperature with a high precision since it is possible to change the chilling ability even for the irregular change of the load.

As described in detail above, according to the invention, since the structural components of the chilling modules are substantially the same, the chilling abilities of the respective modules are substantially the same, the compressors which are part of the structural components are controlled in capacity, and the number of the operated chilling modules is changed in response to the whole necessary capacity value as a function of the deviation between the chilling water temperature and the chilling water set value calculated by the control module, it is possible to change the chilling ability to perform the control of the chilling water temperature with a high precision over a wide chilling load.

What is claimed is:

1. A water chilling apparatus comprising a plurality of chilling modules each having a refrigerating cycle mainly composed of a compressor, a condensor, an evaporator and an expansion mechanism, and a control module having a water pump for feeding, to an object to be chilled, chilling water cooled down by the evaporator of each chilling module, a detector for detecting a temperature of the chilling water and a water temperature controller, wherein a chilling ability of each chilling module in response to a variable frequency is kept at substantially the same level; a capacity of the compressor of each chilling module is variably controlled in a range between an upper limit capacity and a lower limit capacity; said water temperature controller is used to calculate a whole necessary capacity value needed in the compressors of all the chilling modules as a function as a deviation between a set value of the chilling water temperature and a chilling water temperature detected by the detector; the number of the operated chilling modules is controlled in response to the whole necessary capacity value and the upper and lower capacities of each of the chilling modules; and the capacity of the compressor of each of the cooling modules is controlled so as to have a capacity value obtained by equally distributing the calculated whole necessary capacity value by the number of the operated chilling modules.

2. The water chilling apparatus according to claim 1, wherein the capacity control of said compressors is performed in accordance with an inverter frequency control for controlling a revolution speed of the compressors and the whole necessary capacity value is calculated as a whole inverter frequency of all the chilling modules for the compressors.

3. In a method for chilling water by using a water chilling apparatus comprising a plurality of chilling modules each having a refrigerating cycle mainly composed of a compressor, a condensor, an evaporator and an expansion mechanism, and a control module having a water pump for feeding, to an object to be chilled, chilling water cooled down by the evaporator of each chilling module, a detector for detecting a temperature of the chilling water and a water temperature controller, said method comprising the following steps of:

providing the chilling modules which have substantially the same chilling ability relative to a variable frequency and in which the compressors are controlled in capacity in a range from an upper capacity and a lower capacity;

calculating a whole necessary capacity value needed in all the chilling modules as a function of a deviation between a set value of the chilling water temperature and a chilling water temperature detected by the detector;

determining the number of the operated chilling modules in response to the whole necessary capacity value and the upper and lower limit capacities of the respective chilling modules; and controlling the capacities of the operated chilling modules so as to have a capacity value obtained by equally distributing the calculated whole necessary capacity value by the number of the operated chilling modules.

4. The water chilling method according to claim 3, wherein the capacity control of said compressors is performed in accordance with an inverter frequency control for controlling a revolution speed of the compressors and the whole capacity value is calculated as a whole inverter frequency of all the chilling modules for the compressors.

* * * * *